(12) United States Patent
Watanabe et al.

(10) Patent No.: US 9,731,353 B2
(45) Date of Patent: Aug. 15, 2017

(54) BAR MATERIAL SUPPLYING DEVICE AND NUMERICAL CONTROL MACHINE TOOL HAVING THE SAME

(71) Applicants: Citizen Machinery Co., Ltd., Nagano (JP); Citizen Watch Co., Ltd., Nishitokyo-shi, Tokyo (JP)

(72) Inventors: Kiyohiko Watanabe, Iruma (JP); Yutaka Shibui, Kawagoe (JP)

(73) Assignees: CITIZEN MACHINERY CO., LTD., Nagano (JP); CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 14/917,489

(22) PCT Filed: Sep. 8, 2014

(86) PCT No.: PCT/JP2014/073645
§ 371 (c)(1),
(2) Date: Mar. 8, 2016

(87) PCT Pub. No.: WO2015/041084
PCT Pub. Date: Mar. 26, 2015

(65) Prior Publication Data
US 2016/0214179 A1 Jul. 28, 2016

(30) Foreign Application Priority Data

Sep. 18, 2013 (JP) .................................. 2013-192718

(51) Int. Cl.
*B23B 7/02* (2006.01)
*B23Q 5/22* (2006.01)
(Continued)

(52) U.S. Cl.
CPC .............. *B23B 13/021* (2013.01); *B23B 7/02* (2013.01); *B23B 13/022* (2013.01);
(Continued)

(58) Field of Classification Search
CPC ....... B23B 13/04; B23B 13/10; B23B 13/123; B23B 13/125; B23B 13/126;
(Continued)

(56) References Cited

U.S. PATENT DOCUMENTS 2,563,464 A * 8/1951 Green ................... B23B 13/123
279/20.1
2,595,522 A * 5/1952 Harney ................... B23B 13/00
221/242
(Continued)

FOREIGN PATENT DOCUMENTS

CN 102665974 A 9/2012
EP 0228551 A2 * 7/1987 ............. B23Q 7/042
(Continued)

OTHER PUBLICATIONS

International Search Report PCT/ISA/210 for International Application No. PCT/JP2014/073645 Dated Dec. 2, 2014.

*Primary Examiner* — Sunil K Singh
*Assistant Examiner* — Ryan Rufo
(74) *Attorney, Agent, or Firm* — Harness, Dickey & Pierce P.L.C.

(57) ABSTRACT

A bar material supplying device includes a feed rod having a leading end provided with a finger chuck, a feed rod servomotor and an air cylinder device that move the feed rod in a longitudinal direction to insert and pull the bar material into and from the finger chuck, and an NC device that controls driving of the feed rod servomotor and driving of the air cylinder device. The NC device controls the driving of the feed rod servomotor and the driving of the air cylinder device to move the feed rod in an operation of inserting and pulling the bar material into and from the finger chuck, and operates as an error allowable device that allows an error of an operation amount of the feed rod servomotor motor in the
(Continued)

operation of inserting and pulling the bar material into and from the finger chuck.

19 Claims, 2 Drawing Sheets

(51) Int. Cl.
  *B23B 13/02* (2006.01)
  *B23B 13/12* (2006.01)
  *B23Q 7/04* (2006.01)
  *B23Q 5/00* (2006.01)
(52) U.S. Cl.
  CPC ........... *B23B 13/123* (2013.01); *B23B 13/125* (2013.01); *B23Q 7/042* (2013.01); *B23Q 2005/005* (2013.01); *B23Q 2707/003* (2013.01)
(58) Field of Classification Search
  CPC ... B23B 13/021; B23B 13/022; B23B 13/027; B23B 7/02; B23B 9/00; B23B 9/02; B23Q 2005/005; B23Q 15/225; B23Q 15/24; B23Q 15/22; B23Q 7/042; B23Q 7/041; B23Q 2707/003; Y10T 82/2518; Y10T 82/2516; Y10T 82/2521
  See application file for complete search history.

(56) References Cited

U.S. PATENT DOCUMENTS

| | | | | |
|---|---|---|---|---|
| 3,131,587 A | * | 5/1964 | Spohn | B23B 13/00 82/126 |
| 3,283,391 A | * | 11/1966 | Thompson | B23B 13/00 29/37 R |
| 3,480,159 A | * | 11/1969 | White | B23B 13/00 414/15 |
| 3,602,075 A | * | 8/1971 | Waefler | B23B 13/00 82/127 |
| 3,918,594 A | * | 11/1975 | Durst | B23B 13/02 414/18 |
| 4,638,693 A | * | 1/1987 | Sugimoto | B23B 13/08 414/14 |
| 4,914,993 A | * | 4/1990 | Fabbri | B23B 13/02 414/18 |
| 5,140,878 A | * | 8/1992 | Fabbri | B23B 13/02 414/18 |
| 5,326,210 A | * | 7/1994 | Savage | B23B 13/04 414/17 |
| 5,520,493 A | * | 5/1996 | Cucchi | B23B 7/06 226/165 |
| 5,890,407 A | * | 4/1999 | Drei | B23B 13/02 82/126 |
| 2002/0005096 A1 | * | 1/2002 | Miyano | B23B 13/02 82/127 |
| 2002/0183888 A1 | * | 12/2002 | Sasaki | B23B 13/02 700/159 |
| 2012/0186407 A1 | | 7/2012 | Nakaya et al. | |

FOREIGN PATENT DOCUMENTS

| | | |
|---|---|---|
| EP | 2484466 A1 | 8/2012 |
| JP | 8-276303 A | 10/1996 |
| JP | 9-117803 A | 5/1997 |
| JP | 2000-176792 A | 6/2000 |
| JP | 2000-222040 A | 8/2000 |
| JP | 2011-073117 A | 4/2011 |
| KR | 10-2012-0093883 A | 8/2012 |
| TW | 201113111 A | 4/2011 |
| WO | WO-2011-040235 A1 | 4/2011 |

* cited by examiner

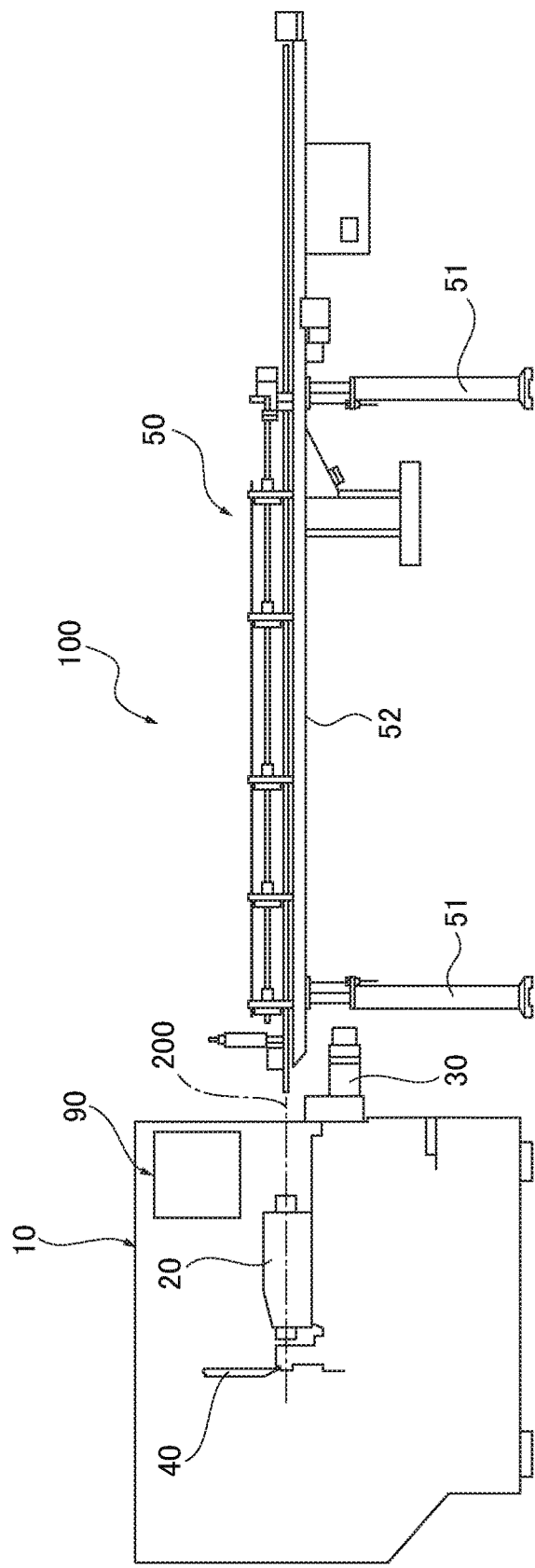

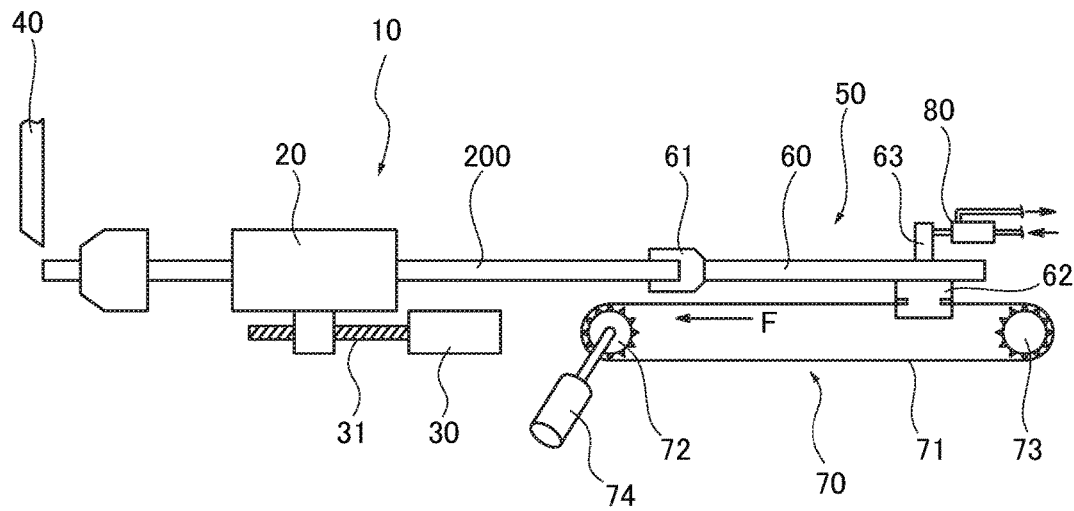
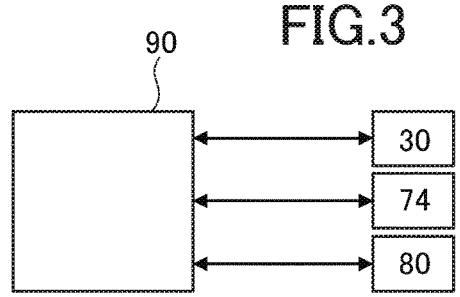
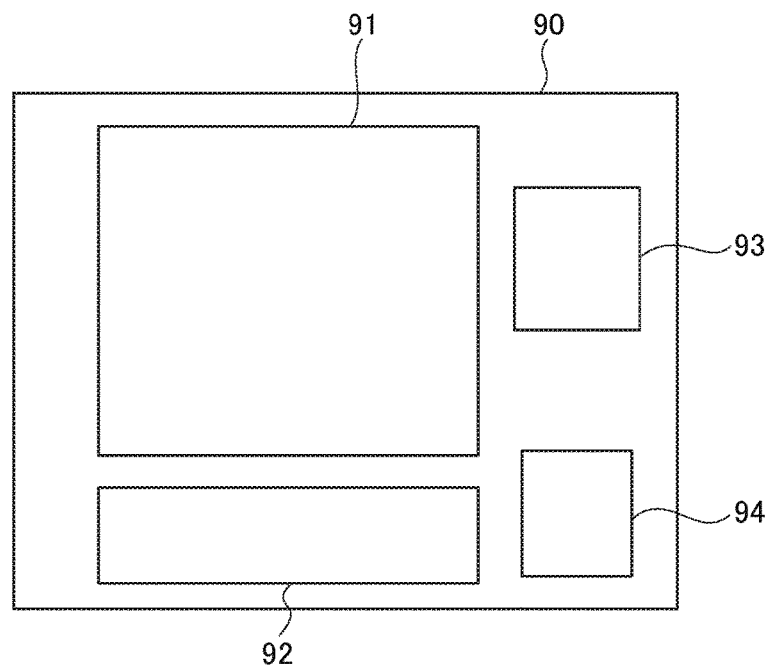

BAR MATERIAL SUPPLYING DEVICE AND NUMERICAL CONTROL MACHINE TOOL HAVING THE SAME

CROSS-REFERENCE TO RELATED APPLICATIONS

This application is a national phase under 35 U.S.C. §371 of PCT International Application No. PCT/JP2014/073645 which has an International filing date of Sep. 8, 2014 which claims priority to Japanese Application No. JP2013-192718, filed Sep. 18, 2013, the entire contents of each of which are hereby incorporated by reference.

TECHNICAL FIELD

This invention is related to a bar material supplying device and a numerical control (NC) machine tool (hereinafter referred to as an NC machine tool) having the same.

BACKGROUND ART

A bar material supplying device supplies a bar material as a working target to an NC machine tool. The bar material supplying device is placed behind the NC machine tool. The bar material supplying device includes a feed rod having a leading end provided with a finger chuck and a motor for driving the feed rod back and forth. In the bar material supplying device, when the feed rod is driven forward, the back end portion of the fixed bar material is inserted into the finger chuck to be chucked by the finger chuck (Patent Literature 1). In the bar material supplying device, the position of the bar material chucked by the finger chuck is fixed, and the bar material is released from the figure chuck by moving the feed rod backward. A control device controls the driving of the motor.

CITATION LIST

Patent Literature

Patent Literature 1: Japanese Laid Open Patent No. H08-276303

SUMMARY

Technical Problem

When chucking a thick bar material having a diameter of 40 mm or more, for example, in the bar material supplying device, the bar material may not be inserted into the finger chuck due to the shortage of the driving force of the motor. The present invention has been made in view of the above circumference, and an object of the present invention is to provide a bar material supplying device capable of chucking a bar material even when driving force of a motor is insufficient and also an NC machine tool including the bar material supplying device.

Solution to Problem

A bar material supplying device according to the present invention includes a feed rod having a leading end provided with a finger chuck that insertably and detachably holds a bar material, a motor and a cylinder device that move the feed rod in a longitudinal direction to insert and pull the bar material into and from the finger chuck, and a control device that controls driving of the motor and driving of the cylinder device, wherein the control device controls the driving of the motor and the driving of the cylinder device to move the feed rod in an operation of inserting and pulling the bar material into and from the finger chuck, and operates as an error allowable device that allows an error of an operation amount of the motor in the operation of inserting and pulling the bar material into and from the finger chuck. An NC machine tool having the bar material supplying device according to the present invention is an NC machine tool including the bar material supplying device according to the present invention.

Advantageous Effects

According to the bar material supplying device and the NC machine tool including the bar material supplying device of the present invention, the feed rod is driven by both of the motor and the cylinder device, so that the bar material can be inserted into the finger chuck by adding the driving force of the cylinder device even when the driving force of the motor is insufficient. Moreover, in the bar material supplying device and the NC machine tool including the bar material supplying device, the error of the control of the motor can be prevented and controlled by the error allowable device even when the error of the operation amount of the motor is larger than the allowable range of the error of the operation amount in an operation except the operation of inserting and pulling the bar material into and from the finger chuck due to the operation of the cylinder device when the bar material is inserted and pulled into and from the finger chuck.

BRIEF DESCRIPTION OF DRAWINGS

FIG. 1 is a view showing an automatic lathe as one example of an NC machine tool having a bar material supplying device according to the present invention.

FIG. 2 is a schematic view showing the details of the automatic lathe shown in FIG. 1.

FIG. 3 is a view showing control of a main spindle servomotor, a feed rod servomotor, and an air cylinder device by an NC device.

FIG. 4 is a view showing a configuration of the NC device.

DESCRIPTION OF EMBODIMENT

An embodiment of a bar material supplying device and an NC machine tool having the bar material supplying device according to the present invention will be described with reference to the drawings.

An automatic lathe 100 of the present embodiment includes an automatic lathe main body 10, a bar material supplying device 50 that supplies a bar material 200 to the automatic lathe main body 10, and an NC device 90 that numerically controls the operation of the automatic lathe main body 10 and the bar material supplying device 50, as shown in FIG. 1.

The automatic lathe main body 10 includes a main spindle 20 that supports the bar material 200 to rotate about an axis and moves along the axis direction, a main spindle servomotor 30 that moves the main spindle 20 in the axis direction by rotating a ball screw 31, and a tool post 40 on which a tool for working the bar material 200 is held, as shown in FIG. 2. The main spindle servomotor 30 is driven based on a command of the NC device 90, as shown in FIG. 3.

The bar material supplying device 50 includes a base 52 extending in a longitudinal direction and two legs 51 and 51 that horizontally support the base 52. The bar material supplying device 50 is placed behind the automatic lathe main body 10 in alignment with the main spindle 20. The bar material supplying device 50 stocks many bar materials 200, and automatically supplies the stocked bar materials 200 one by one to the automatic lathe main body 10. The base 52 includes inside thereof a feed rod 60 that pushes and pulls the bar material 200 in the longitudinal direction along the base 52, a chain 71 that is connected to the feed rod 60 through a connection member 62 and is circularly provided along the longitudinal direction, and a feed rod servomotor 74 and an air cylinder device 80 that drive the chain 71 in the longitudinal direction.

The feed rod servomotor 74 and the air cylinder device 80 are driven based on the command of the NC device 90. A finger chuck 61 is provided in the front end of the feed rod 60. The finger chuck 61 has a cylinder with the longitudinal direction of the feed rod 60 as an axis. A plurality of slots each of which extends in the axis direction is formed in a circumference wall of the cylinder. The bar material 200 having a diameter larger than the inner diameter of the cylinder is inserted into the cylinder by opening the slots while elastically deforming the circumference wall outward, so that the bar material 200 is chucked.

The chain 71 is wound around a driving sprocket 72 that is disposed in the front and is connected to the feed rod servomotor 74 and a driven sprocket 73 that is disposed in the back, and is driven back and forth along the rotation of the driving sprocket 72. The chain 71 is connected to the air cylinder device 80 through a connection member 63.

The air cylinder device 80 drives the chain 71 forward along with the feed rod servomotor 74 when the finger chuck 61 chucks the bar material 200. The air cylinder device 80 drives the chain 71 backward along with the feed rod servomotor 74 when the finger chuck 61 releases the bar material 200.

Upon the driving of the feed rod servomotor 74, the driving sprocket 72 rotates, and the chain 71 is driven forward or backward according to the rotation direction of the feed rod servomotor 74. The air cylinder device 80 drives the chain 71 back and forth when the air cylinder device 80 is connected to the chain 71 while the air cylinder device 80 does not drive the chain 71 when the air cylinder device 80 is disconnected from the chain 71. When chucking the bar material 200 by the finger chuck 61, the air cylinder device 80 is connected to the chain 71 to drive the chain 71 forward along with the feed rod servomotor 74 while the bar material 200 is fixed on the base 52 by a not-shown fixing member such as a stopper. By adding the driving force of the air cylinder device 80 to the driving force of the feed rod servomotor 74, even when the bar material 200 has a diameter of 40 mm or more, for example, the feed rod 60 moves forward against the frictional force between the finger chuck 61 and the bar material 200 and the elastic force (fitting resistance force) that opens the slits, and the back end of the bar material 200 is inserted into the finger chuck 61. The bar material 200 is thereby chucked by the finger chuck 61.

After chucking the bar material 200, the fixation of the bar material 200 by the fixing member is released, the chain 71 is disconnected from the air cylinder device 80, and the chain 71 is driven only by the feed rod servomotor 74. The bar material 200 is supplied to the automatic lathe main body 10 by moving the feed rod 60 forward or the bar material 200 is collected from the automatic lathe main body 10 by moving the feed rod 60 backward.

When releasing the collected bar material 200 from the finger chuck 61, the air cylinder device 80 is connected to the chain 71 to drive the chain 71 backward along with the feed rod servomotor 74 while the bar material 200 is fixed on the base 52 by the fixing member. By adding the driving force of the air cylinder device 80 to the driving force of the feed rod servomotor 74, even when the bar material 200 has the dimeter of 40 mm or more, for example, the feed rod 60 moves backward against the frictional force (fitting force) between the finger chuck 61 and the bar material 200. The bar material 200 is thereby released from the finger chuck 61. After releasing the bar material 200, the fixation of the bar material 200 by the fixing member is released, and the air cylinder device 80 is disconnected from the chain 71.

The NC device 90 controls the operation of supplying one bar material 200 from the stocked many bar materials 200 to the base 52 and the operation of the fixing member that controls the movement of the bar material 200 in addition to the driving of the main spindle servomotor 30, the feed rod servomotor 74, and the air cylinder device 80 and the driving of the tool post 40 and a not shown motor for rotating the main spindle 20. The NC device 90 is disposed in a part of the automatic lathe main body 10, and includes an input section 92 that inputs coded commands, a memory 93 that stores the input commands and various determination standards, and a controller 94 that outputs control signals to the automatic lathe main body 10 and the bar material supplying device 50 according to the commands.

The controller 94 compares a positional deviation (angle deviation) between the positional command (rotation angle command of feed rod servomotor 74) of the feed rod 60 to the feed rod servomotor 74 and a feedback position (actual rotation angle of operation amount of feed rod servomotor 74) of the feed rod 60 for the feedback control of the servomotor with an allowable range of an error of the operation amount as one of the determination standard values stored in the memory 93, and determines the existence or non-existence of an excessive error. When the operation amount specified by the operation signals deviates from the allowable range of the error, the controller 94 determines the excessive error of the operation amount of the feed rod servomotor 74. The controller 94 stops the operation and displays the excessive error on a display 91. When the operation amount specified by the operation signals does not deviate from the allowable range of the error, the controller 94 determines no excessive error of the operation amount of the feed rod servomotor 74. The controller 94 continues the operation without stopping the servomotor. Namely, the controller 94 constitutes one example of an error allowable device that allows the error of the operation amount of the feed rod servomotor 74 in the operation of inserting and pulling the bar material 200 into and from the finger chuck 61. The memory 93 stores a first allowable range that is an allowable range of the error of the operation amount of the feed rod servomotor 74 corresponding to the releasing and the chucking of the bar material 200 and a second allowable range that is an allowable range of the error of the operation amount of the feed rod servomotor 74 corresponding to the normal back and forth driving of the chain 71 only by the feed rod servomotor 74. The first allowable range is set to be larger than the second allowable range.

The controller 94 selects the first allowable range in the chucking and the releasing, while the controller 94 selects the second allowable range in the normal back and forth driving. More specifically, when the command output to the bar material supplying device 50 corresponds to the operation of chucking the bar material 200 and the operation of releasing the bar material 200, the first allowable range is selected. When the command corresponds to an operation except the operation of chucking and releasing, the second allowable range is selected. The controller 94 compares the selected first allowable range or second allowable range with the above-described positional deviation (angle deviation).

The driving force of the chain 71 by the air cylinder device 80 is larger than the driving force of the chain 71 by the feed rod servomotor 74, and the driving speed of the chain 71 by the air cylinder device 80 is faster than the driving speed of the chain 71 by the feed rod servomotor 74. Consequently, when the air cylinder device 80 drives the chain 71 in the chucking and the releasing of the bar material 200, the feed rod servomotor 74 excessively rotates along with the driving of the chain 71. The above-described positional deviation (angle deviation) deviates from the second allowable range, and the controller 94 determines the operation error of the feed rod servomotor 74, so that the controller 94 stops the operation or displays the excessive error on the display 91.

In the automatic lathe 100 of the present embodiment, the controller 94 selects the first allowable range in the chucking and the releasing. With this configuration, although the feed rod servomotor 74 deviates from the rotation angle to be originally controlled due to the driving of the air cylinder device 80, when the above-described positional deviation (angle deviation) is within the first allowable range, the controller 94 determines no error of the operation of the feed rod servomotor 74, continues the operation without stopping the servomotor, and does not display the excessive error on the display 91. The operation rate of the automatic lathe 100 can be therefore improved.

The controller 94 rotates the feed rod servomotor 74 to control the positional deviation when the above-described positional deviation occurs. In this case, the driving current of the feed rod servomotor 74 increases in accordance with an increase in the positional deviation. The controller 94 stops the operation as an error when the driving current of the feed rod servomotor 74 exceeds a predetermined limit value.

The controller 94 of the present embodiment includes a current controller that controls the driving current of the feed rod servomotor 74 not to exceed a predetermined value smaller than the predetermined limit value. When the first allowable range is selected, the driving current to the feed rod servomotor 74 does not exceed the above-described predetermined value by operating the current controller.

The error due to the excessive driving current is therefore prevented, the feed rod servomotor 74 freely rotates in a range in which the positional deviation is within the first allowable range, and the bar material 200 is smoothly chucked and released by and from the finger chuck 61. When the feed rod servomotor 74 rotates in the range in which the positional deviation is within the first allowable range, if the driving current of the feed rod servomotor 74 does not exceed the limit value, it is not always necessary to operate the current controller. In the automatic lathe 100 of the present embodiment, the NC device 90 that controls the automatic lathe main body 10 is used as the control device of the present invention. However, the present invention is not limited to the above embodiment, and a control device dedicated for the bar material supplying device can be used. The bar material supplying device including such a control device dedicated for the bar material supplying device is one example of the bar material supplying device of the present embodiment.

CROSS-REFERENCE TO RELATED APPLICATION

The present application is based on and claims priority from Japanese Patent Application No. 2013-192718, filed on Sep. 18, 2013, the disclosure of which is hereby incorporated by reference in its entirety.

REFERENCE SIGNS LIST

10 Automatic lathe main body
20 Main spindle
30 Main spindle servomotor
50 Bar material supplying device
60 Feed rod
61 Finger chuck
71 Chain
74 Feed rod servomotor
80 Air cylinder device (cylinder device)
90 NC device
100 Automatic lathe (Numerical control machine tool)
200 Bar material

The invention claimed is:

1. A bar material supplying device, comprising:
a feed rod having a leading end, the leading end including a finger chuck, the finger chuck configured to insertably and detachably hold a bar material;
a motor and a cylinder device, each of the motor and the cylinder device independently configured to move the feed rod in a longitudinal direction to insert the bar material into the finger chuck or pull the bar material from the finger chuck; and
a control device configured to control driving of the motor and driving of the cylinder device, wherein
the control device is configured to control the driving of the motor and the driving of the cylinder device to move the feed rod in an operation of inserting and pulling the bar material into and from the finger chuck, and
the control device is further configured to allow an error of an operation amount of the motor in the operation of inserting and pulling the bar material into and from the finger chuck.

2. The bar material supplying device according to claim 1, wherein the control device is configured to set an allowable range of the error of the operation amount of the motor to be larger than an allowable range of an error of an operation amount in an operation except the operation of inserting and pulling the bar material into and from the finger chuck.

3. The bar material supplying device according to claim 1, wherein the control device includes a current controller that is configured to control a driving current of the motor.

4. The bar material supplying device according to claim 1, wherein the cylinder device is configured to be isolated from driving the feed rod in an operation except the operation of inserting and pulling the bar material into and from the finger chuck.

5. The bar material supplying device according to claim 1, further comprising:
a memory configured to store
an allowable range corresponding to the operation of inserting and pulling the bar material into and from the finger chuck, and an allowable range corresponding to an operation except the operation of inserting and pulling the bar material into and from the finger chuck, wherein the control device is configured to select the allowable range corresponding to the operation of inserting and pulling the bar material into and from the finger chuck of the memory when inserting and pulling the bar material into and from the finger chuck, and select the allowable range corresponding to the operation except the operation of inserting and pulling the feed rod into and from the finger chuck of the memory in the operation except the operation of inserting and pulling the bar material into and from the finger chuck to determine the error of the operation amount of the motor.

6. The bar material supplying device according to claim 1, wherein the control device is configured to set a size of an allowable range of the error of the operation amount of the motor according to a command code of the operation to the bar material supplying device that corresponds to the operation of inserting and pulling the bar material into and from the finger chuck.

7. A numerical control machine tool including the bar material supplying device according to claim 1.

8. The bar material supplying device of claim 1, wherein at least the cylinder device is coupled to the feed rod, and is further configured to move the feed rod in the longitudinal direction, via a connection member that is connected to an exterior of the feed rod.

9. An apparatus, comprising:
a feed rod having a leading end, the leading end including a finger chuck, the finger chuck configured to insertably and detachably hold a bar material; and
a motor and a cylinder device, each of the motor and the cylinder device independently configured to move the feed rod in a longitudinal direction to insert the bar material into the finger chuck or pull the bar material from the finger chuck.

10. The apparatus of claim 9, wherein each of the motor and the cylinder device are coupled to the feed rod via separate, independent connection members.

11. The apparatus of claim 10, further comprising:
a chain coupled to the feed rod, such that the feed rod is configured to be moved in the longitudinal direction based on a movement of the chain,
wherein the motor is coupled to the chain, such that the motor is configured to drive the chain in the longitudinal direction to move the feed rod in the longitudinal direction, and
wherein the cylinder device is coupled to the chain independently of the motor, such that the cylinder device is configured to drive the chain in the longitudinal direction, independently of the motor, to move the feed rod in the longitudinal direction.

12. The apparatus of claim 11, wherein the cylinder device is configured to be disconnected from the chain.

13. The apparatus of claim 9, further comprising:
a control device configured to control driving of the motor and driving of the cylinder device, wherein
the control device is configured to control the driving of the motor and the driving of the cylinder device to move the feed rod in an operation of inserting and pulling the bar material into and from the finger chuck, and
the control device is further configured to allow an error of an operation amount of the motor in the operation of inserting and pulling the bar material into and from the finger chuck.

14. The apparatus of claim 13, wherein the control device is configured to set an allowable range of the error of the operation amount of the motor to be larger than an allowable range of an error of an operation amount in an operation except the operation of inserting and pulling the bar material into and from the finger chuck.

15. The apparatus of claim 13, wherein the control device includes a current controller that is configured to control a driving current of the motor.

16. The apparatus of claim 13, wherein the cylinder device is configured to be isolated from driving the feed rod in an operation except the operation of inserting and pulling the bar material into and from the finger chuck.

17. The apparatus of claim 13, further comprising:
a memory configured to store
an allowable range corresponding to the operation of inserting and pulling the bar material into and from the finger chuck, and
an allowable range corresponding to an operation except the operation of inserting and pulling the bar material into and from the finger chuck,
wherein the control device is configured to
select the allowable range corresponding to the operation of inserting and pulling the bar material into and from the finger chuck of the memory when inserting and pulling the bar material into and from the finger chuck, and
select the allowable range corresponding to the operation except the operation of inserting and pulling the feed rod into and from the finger chuck of the memory in the operation except the operation of inserting and pulling the bar material into and from the finger chuck to determine the error of the operation amount of the motor.

18. The apparatus of claim 13, wherein the control device is configured to set a size of an allowable range of the error of the operation amount of the motor according to a command code of the operation that corresponds to the operation of inserting and pulling the bar material into and from the finger chuck.

19. The apparatus of claim 9, wherein at least the cylinder device is coupled to the feed rod, and is further configured to move the feed rod in the longitudinal direction, via a connection member that is connected to an exterior of the feed rod.

* * * * *